United States Patent
Hoeschen et al.

(10) Patent No.: US 9,063,338 B2
(45) Date of Patent: Jun. 23, 2015

(54) AUTOSTEREOSCOPIC DISPLAY THAT PROVIDES A 3-DIMENSIONAL VISUAL IMPRESSION

(75) Inventors: Christoph Hoeschen, Hebertshausen (DE); Oleg Tischenko, München (DE); Matthias Klaften, München (DE); Lars Kroker, Hamburg (DE); Michael Scholles, Dresden (DE); Jens Knobbe, Dresden (DE)

(73) Assignee: Helmholtz Zentrum München Deutsches Forschungszentrum für Gesundheit und Umwelt (GmbH) (DE)

( * ) Notice: Subject to any disclaimer, the term of this patent is extended or adjusted under 35 U.S.C. 154(b) by 363 days.

(21) Appl. No.: 13/509,501

(22) PCT Filed: Mar. 9, 2010

(86) PCT No.: PCT/EP2010/001460
§ 371 (c)(1),
(2), (4) Date: Jun. 28, 2012

(87) PCT Pub. No.: WO2011/057681
PCT Pub. Date: May 19, 2011

(65) Prior Publication Data
US 2012/0262502 A1     Oct. 18, 2012

(30) Foreign Application Priority Data
Nov. 11, 2009   (DE) .......................... 10 2009 052 653

(51) Int. Cl.
*G09G 5/10*    (2006.01)
*G02B 27/22*   (2006.01)
(Continued)

(52) U.S. Cl.
CPC .......... *G02B 27/2214* (2013.01); *G02B 27/225* (2013.01); *G02B 27/2264* (2013.01); *H04N 5/232* (2013.01); *H04N 13/0404* (2013.01); *H04N 13/0418* (2013.01)

(58) Field of Classification Search
CPC ............. G02B 27/225; G02B 27/2264; G02B 27/2214; G02B 26/02; H04N 13/0404; H04N 13/0418; H04N 5/232; G02F 1/33603; G02F 2001/133613; G06F 3/038; G09G 2310/0232; G09G 3/03406
USPC ........................................................ 345/102
See application file for complete search history.

(56) References Cited

U.S. PATENT DOCUMENTS 5,083,199 A     1/1992   Börner
6,859,240 B1 *  2/2005   Brown et al. ................... 349/15
(Continued)

FOREIGN PATENT DOCUMENTS

DE     39 21 061 A1     1/1991
DE     43 12 918 A1    10/1994
(Continued)

*Primary Examiner* — Stephen Sherman
(74) *Attorney, Agent, or Firm* — DLA Piper LLP (US)

(57) ABSTRACT

An autostereoscopic display includes a background illumination with a multiplicity of parallel light strip groups with in each case at least two parallel light strips, wherein the individual light strip groups are arranged next to one another with a first grid dimension, and a lens grid arranged before the background illumination and has a multiplicity of parallel lens strips, wherein the lens strips are arranged next to one another with a second grid dimension, as well as a light modulator arranged before the lens grid and displays image information.

10 Claims, 4 Drawing Sheets

(51) Int. Cl.
*H04N 5/232* (2006.01)
*H04N 13/04* (2006.01)

(56) References Cited

U.S. PATENT DOCUMENTS

| | | | |
|---|---|---|---|
| 7,382,384 B2* | 6/2008 | Winters et al. | 345/695 |
| 8,363,100 B2* | 1/2013 | Lu | 348/117 |
| 2005/0046951 A1* | 3/2005 | Sugihara et al. | 359/619 |
| 2006/0279567 A1* | 12/2006 | Schwerdtner et al. | 345/419 |
| 2007/0008617 A1* | 1/2007 | Shestak et al. | 359/455 |
| 2007/0096125 A1* | 5/2007 | Vogel et al. | 257/89 |
| 2007/0153380 A1 | 7/2007 | Shestak | |
| 2007/0188667 A1* | 8/2007 | Schwerdtner | 349/15 |
| 2008/0037120 A1* | 2/2008 | Koo et al. | 359/463 |
| 2008/0186272 A1* | 8/2008 | Huang et al. | 345/102 |
| 2009/0135108 A1* | 5/2009 | Lindfors et al. | 345/76 |
| 2010/0283717 A1* | 11/2010 | Oka et al. | 345/102 |

FOREIGN PATENT DOCUMENTS

| | | |
|---|---|---|
| DE | 44 16 935 C2 | 3/1996 |
| DE | 10 2005 029 431 A | 1/2007 |
| EP | 1 705 927 A1 | 9/2006 |
| EP | 1 742 492 A2 | 1/2007 |
| JP | 2004-20684 | 1/2004 |
| JP | 2005-77437 | 3/2005 |
| JP | 2007-503606 | 2/2007 |
| JP | 2009-15100 | 1/2009 |

\* cited by examiner

AUTOSTEREOSCOPIC DISPLAY THAT PROVIDES A 3-DIMENSIONAL VISUAL IMPRESSION

RELATED APPLICATIONS

This is a §371 of International Application No. PCT/EP2010/001460, with an international filing date of Mar. 9, 2010 (WO 2011/057681 A1, published May 19, 2011), which is based on German Patent Application No. 10 2009 052 653.6, filed Nov. 11, 2009, the subject matter of which is incorporated by reference.

TECHNICAL FIELD

This disclosure relates to an autostereoscopic display.

BACKGROUND

Stereoscopic image reproduction devices are known which provide the viewer with a three-dimensional visual impression by showing the viewer's two eyes different images which were recorded from slightly offset perspectives. The image separation between the images for the two eyes of the viewer is important, so that the viewer receives a three-dimensional visual impression. One possibility for the image separation is that the viewers wear polarized glasses with differently orientated polarization filters for the two eyes. Another possibility for the image separation is that the viewers wear red/green glasses. In stereoscopic image reproduction devices of this type, the viewers must, therefore, wear glasses to achieve the image separation, which is undesirable.

Furthermore, autostereoscopic image reproduction devices are also known in the case of which the viewer receives a three-dimensional visual impression without auxiliaries of this type such as, for example, polarized glasses. An example of an autostereoscopic display of this type is known from DE 10 2005 029 431 A1, which essentially consists of an OLED background illumination (OLED: Organic Light Emitting Diode), a lens grid and an LCD display (LCD: Liquid Crystal Display) as light modulator. Although this publication is fundamentally aimed in a somewhat different direction, it also that the LCD display can display images for the two eyes of the viewer alternately in a time-sequential manner. By contrast, the OLED background illumination has the task, in connection with the lens grid, of only illuminating the eye of the viewer for which the LCD display is currently displaying an image in each case. In this manner, it is prevented that the other eye of the viewer, for which the currently shown image is not meant, likewise perceives this image. On the one hand, the image separation required for achieving a three-dimensional visual impression is, therefore, achieved in that the LCD display shows images for the two eyes of the viewer in a time sequential manner. On the other hand, the image separation is also achieved, however, in that the OLED background illumination together with the lens grid only illuminates the correct eye in each case so that the other eye does not perceive the image shown by the LCD display.

The unsatisfactory visual impression is disadvantageous for this known autostereoscopic display.

It could therefore be helpful to improve the previously described conventional autostereoscopic display.

SUMMARY

We provide an autostereoscopic display including a) a background illumination with a plurality of parallel light strip groups with in each case at least two parallel light strips, wherein the individual light strip groups are arranged next to one another with a first grid dimension, b) a lens grid arranged in a beam path before the background illumination and having a plurality of parallel lens strips, wherein the lens strips are arranged next to one another with a second grid dimension, and a light modulator arranged in the beam path before the lens grid and displaying image information, wherein the first grid dimension of the background illumination differs from the second grid dimension of the lens grid.

REFERENCE LIST

Figure 1:
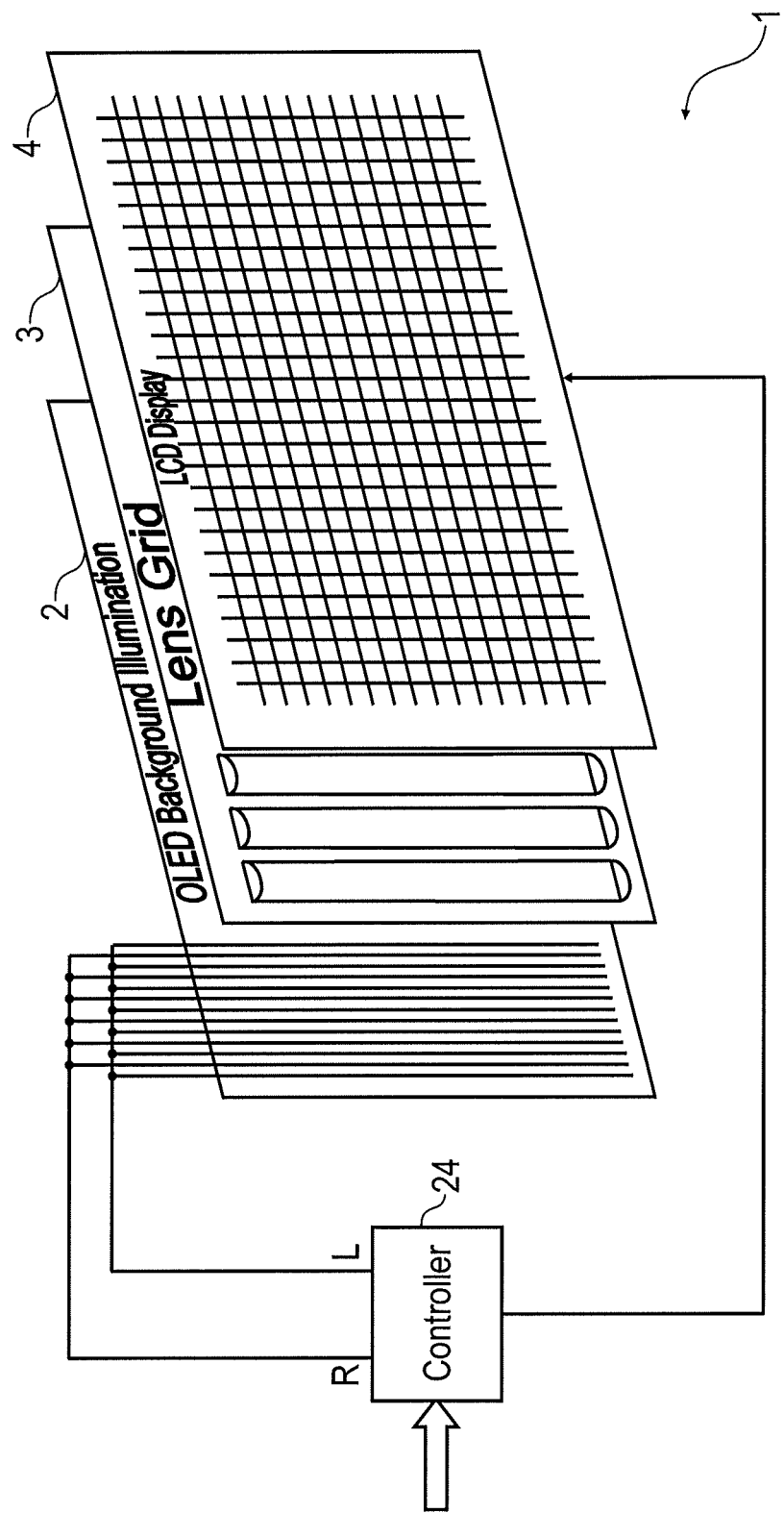
FIG. 1 shows a simplified perspective illustration of an autostereoscopic display with an OLED background illumination, a lens grid and an LCD display.

1 Autostereoscopic display
2 OLED background illumination
3 Lens grid
4 LCD display
5 Light strip groups
6 Light strips
7 Light strips
8 Lens strips
9 Optical axis of the lens strips
10 Central axis of the light strip groups
11 Display center
rm1 Grid dimension of the light strip groups
rm2 Grid dimension of the lens grid
12-15 Conductor rails
16, 17 Light strips for adjustment purposes
18-21 Conductor rails for the light strips for adjustment purposes
22, 23 Light strips for adjustment purposes
24 Controller

DETAILED DESCRIPTION

Our displays are based on the discovery that the different light strip groups of the OLED background illumination are in each case assigned to exactly one lens strip of the lens grid and have the same grid dimension. This means that precisely one light strip group of the OLED background illumination lies behind each lens strip of the lens grid in an exactly orient manner. The consequence of this is that the light strip groups located in the display center illuminate a different region in the viewing plane than the outer light strip groups at the edges of the display. It is also desirable for the achievement of a good visual impression, however, that all of the light strip groups illuminate the same region in the viewing plane, which is also designated in the pertinent specialist terminology as "eye box" or "viewing zone," independently of their spatial position within the display.

We therefore provide the general technical teaching that the light strip groups of the background illumination have a different grid dimension than the strip lenses of the lens grid, wherein the deviation between the two grid dimensions is preferably selected such that all of the light strip groups of the background illumination illuminate the same region ("eye box") in the viewing plane independently of their position within the display. The grid dimension of the light strip groups of the background illumination is, therefore, preferably slightly larger than the grid dimension of the lens strips of the lens grid. For example, the grid dimension of the light strip group of the background illumination can be at least 1%, 2%, 3% or at least 5% larger than the grid dimension of the lens strips of the lens grid.

It is to be mentioned, however, that the lens grid itself preferably has a constant grid dimension, just as the background illumination itself also has a constant grid dimension.

Furthermore, it is to be mentioned that a certain offset exists between the optical axis of the individual lens strips and the central axis of the individual light strip groups, which offset varies in the preferred examples within the active surface of the display. Preferably, the offset between the central axis of the light strip groups and the optical axis of the associated lens strip of the lens grid in the display center is minimal and increases outwardly to the display edges. It can be achieved that the different light strip groups illuminate the same region ("eye box") in the viewing plane, independently of their position in the display.

Furthermore, we adjust the background illumination relative to the lens grid. So, the background illumination must be positioned exactly relatively to the lens grid to achieve the desired three-dimensional visual impression. To facilitate this adjustment, it is provided in one example that at least one light strip of the background illumination is longer than the other light strips and protrudes from the background illumination in the longitudinal direction. This protruding light strip can then be used to adjust the background illumination in relation to the lens grid.

In a preferred example, the longer light strip used to facilitate the adjustment is arranged exactly in the center of the background illumination.

Furthermore, there is also the possibility that a longer light strip is arranged externally on the edges of the background illumination for adjustment facilitation in each case.

Further, we address the electricity supply of the light strips. So, the electricity supply of the light strips preferably takes place by conductor rails, wherein the light strips used for adjustment facilitation on the one hand and the remaining light strips on the other hand are preferably supplied with electricity by separate conductor rails. This offers the possibility that the conductor rails for electricity supply of the light strips used for adjustment facilitation are realized with a smaller current-carrying cross section than the conductor rails for electricity supply of the remaining light strips.

It is furthermore to be mentioned that the background illumination is preferably divided into a plurality of regions which can be controlled separately from one another. Preferably, these separately controllable regions are four quadrants. The background of this technical measure is the limited refresh rate of the LCD display, which demands a corresponding adaptation of the design of the background illumination in that the background illumination enables a markedly simplified "scrolling backlight."

The autostereoscopic display preferably also has a controller which controls the background illumination on the one hand and the light modulator (e.g., LCD display) in a time-synchronized manner. This time-synchronized control is important so that the background illumination, in connection with the lens grid, illuminates precisely the eye of the viewer at a certain point in time, for which the light modulator (e.g., LCD display) is currently displaying an image. The controller, therefore, controls the light modulator (e.g., LCD display) such that the light modulator displays different images for the two eyes of the viewer in a time-sequential manner. Furthermore, the controller controls the background illumination such that the different light strips illuminate the two eyes of the viewer in a time-sequential manner.

Furthermore, it is also to be mentioned that the display is not limited to an LCD display with regard to the structural design and the functioning of the light modulator, but rather can also fundamentally be realized with other types of light modulators.

It is further to be mentioned that the background illumination is preferably an OLED illumination which preferably has numerous light strips which can be controlled independently of one another.

Finally, it is to be noted that the display is particularly well suited for use in medical imaging. We also provide for applications in the entertainment industry. For example, the display can be used in a games console.

Other advantageous developments are explained in more detail in the following together with the description of preferred example on the basis of the figures.

The drawings show an autostereoscopic display 1, which corresponds to some extent to the autostereoscopic display as disclosed in DE 10 2005 029 431 A1 so that, to avoid repetition, reference is made to that application, the subject matter of which is incorporated herein by reference.

The autostereoscopic display 1 has an OLED background illumination 2, a lens grid 3 and an LCD display 4, which are in each case constructed in a flat manner and are arranged parallel and in layers one in front of the other.

Figure 4:
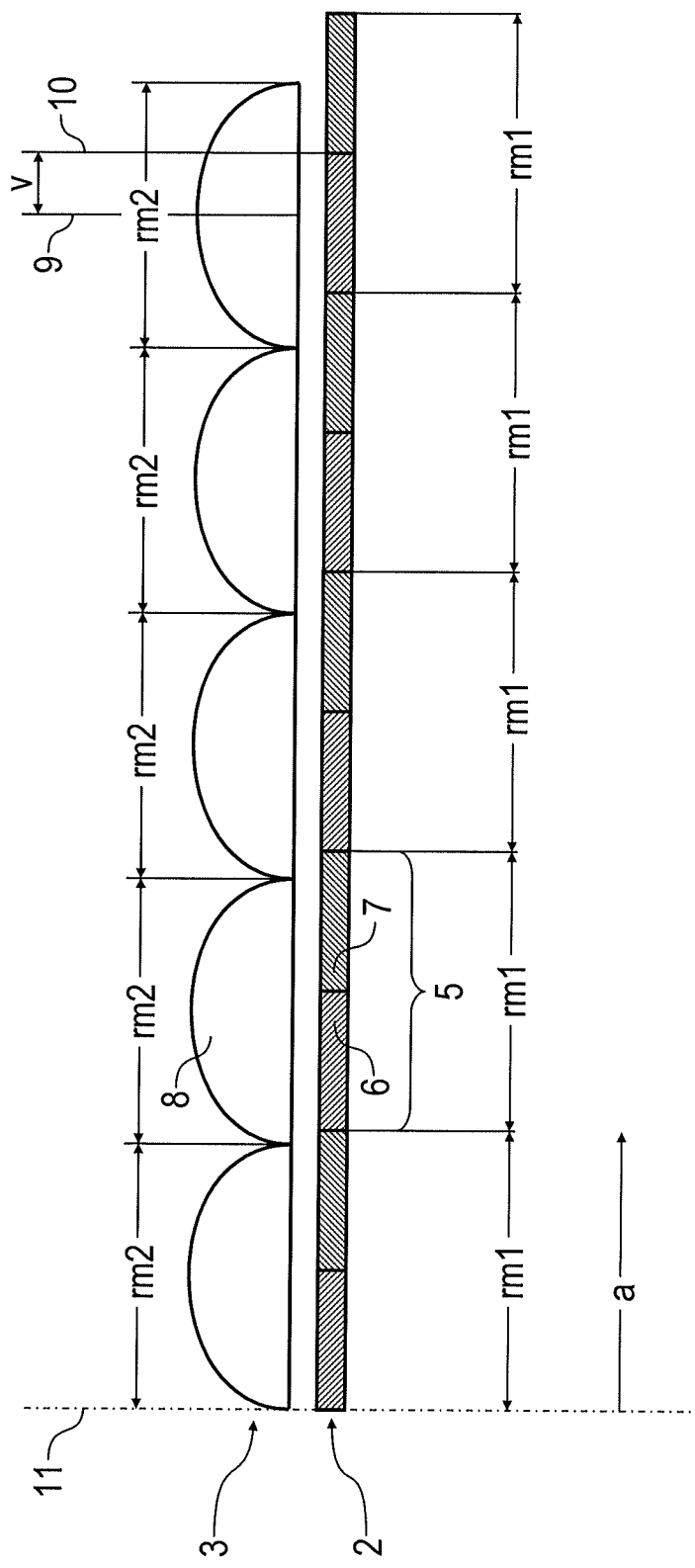
FIG. 4 shows a simplified schematic illustration for clarifying the different grid dimensions of the lens grid and the background illumination.

The OLED background illumination 2 has a multiplicity of parallel light strip groups 5 (cf. FIG. 4), wherein the individual light strip groups 5 in each case have a pair of parallel light strips 6, 7 to illuminate the different eyes of the viewer.

There is alternatively also the possibility, however, that the individual light strip groups 5 in each case have a plurality of pairs of light strips to enable a multiple-user operation. This means that correspondingly many viewers then receive a three-dimensional visual impression at the same time.

It is furthermore to be mentioned that the individual light strip groups 5 are arranged parallel next to one another with a grid dimension rm1.

By contrast, the lens grid 3 has a multiplicity of lens strips 8 arranged parallel next to one another with a certain grid dimension rm2.

What is important here is that the grid dimension rm1 of the OLED background illumination 2 is slightly larger than the grid dimension rm2 of the lens grid 3. The consequence of this is that a lateral offset v is created between an optical axis 9 of the lens strip 8 on the one hand and a central axis 10 of the light strip group 5.

The lens grid 3 is positioned and oriented relative to the OLED background illumination 2 such that the offset v between the optical axis 9 of the lens strips 8 and the central axis 10 of the light strip groups 5 in the display center 11 is minimal and increases outwardly with increasing distance a from the display center 11 to the display edges.

The difference between the grid dimension rm1 of the OLED background illumination 2 and the grid dimension rm2 of the lens grid 3 is dimensioned such here that the light strip groups 5 close to the edges, in cooperation with the lens grid 3, illuminate the same regions in the viewer plane as the central light strip groups close to the display center 11.

Figure 3:
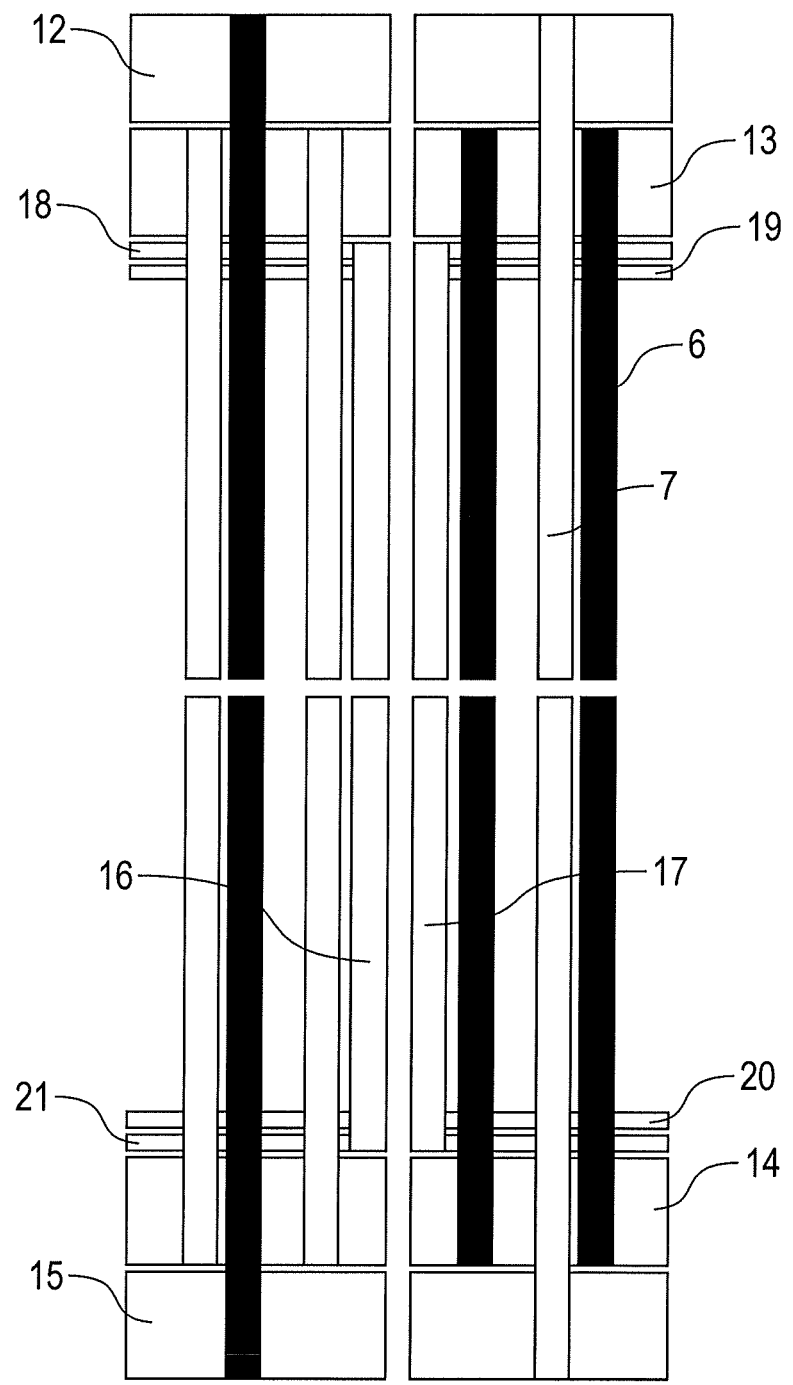
FIG. 3 shows an enlarged illustration of the center region of the autostereoscopic display according to FIG. 1 with the different light strip groups.

It can furthermore be seen from FIG. 3 that the different light strips 6, 7 of the individual light strip groups 5 are supplied with electricity by separate conductor rails 12-15.

Furthermore, the OLED background illumination has light strips 16, 17 used for adjustment purposes in the display center, which light strips are elongated with respect to the other light strips, as cannot be seen directly from FIG. 3, however. These light strips 16, 17, which are used for adjustment purposes, are supplied with electricity by separate conductor rails 18-21.

The conductor rails 12-15 for the electricity supply of the normal light strips 6, 7 have a larger current-carrying cross section than the conductor rails 18-21 for the electricity supply of the light strips 16, 17, which are just used for adjustment purposes.

Furthermore, the OLED background illumination also has two elongated light strips 22, 23 at the lateral edges on the outside, which are likewise used for adjustment purposes, as can be seen from FIG. 1

Further, it is also to be mentioned that the autostereoscopic display 1 has a controller 24 (cf. FIG. 1), which controls the OLED background illumination 2 on the one hand and the LCD display 4 on the other hand, wherein the control takes place in a time-synchronized manner.

So, the controller 24 controls the LCD display 4 such that the LCD display 4 displays images for the two eyes of the viewer in a time-sequential manner.

The OLED background illumination 2 is in this case controlled by the controller 24 such that the light strips 6 and 7 to illuminate the eye for which the LCD display 4 is currently displaying an image are activated in a time-sequential manner.

In the event, for example, that the LCD display 4 displays an image for the right eye of the viewer, then the OLED background illumination 2 illuminates the region ("eye box") in the viewer plane in which the right eye of the viewer is located. The region in the viewer plane in which the left eye of the viewer is located is, by contrast, not illuminated then, so that the left eye also then does not perceive the image meant for the right eye.

In the event, in contrast, that the LCD display 4 displays an image for the left eye of the viewer, then the OLED background illumination 2 illuminates the region ("eye box") in the viewer plane in which the left eye of the viewer is located. The region in the viewer plane in which the right eye of the viewer is located is, in contrast, not illuminated then, so that the right eye also then does not perceive the image meant for the left eye.

This time-sequential image display by the LCD display 4, therefore, realized the desired image separation in connection with the time-sequential control of the OLED background illumination 2.

Figure 2:
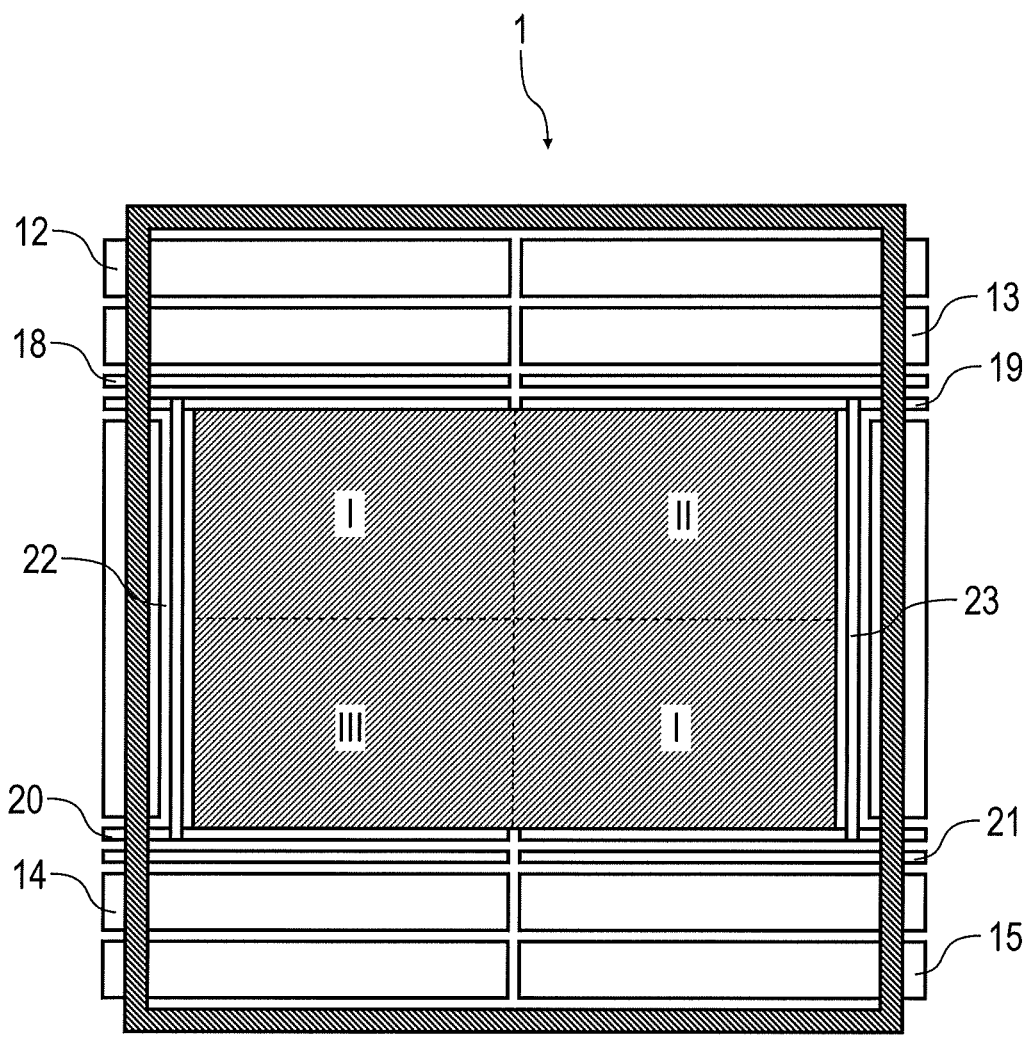
FIG. 2 shows a view onto the autostereoscopic display according to FIG. 1.

It is further to be mentioned that the active surface of the autostereoscopic display 1 is divided into four quadrants I, II, III and IV, as can be seen from FIG. 2. The individual quadrants I, II, III and IV can be controlled separately and independently of one another and thus enable a markedly simplified "scrolling backlight" to compensate the limited refresh rate of the LCD display 4.

Particularly advantageous is the fact that, on account of the time-sequential image display by the LCD display 4, no optical resolution is lost.

Furthermore, the autostereoscopic display 1 enables a multiple-user operation, in which a plurality of viewers can see the same three-dimensional scene at the same time and receive a three-dimensional visual impression in the process.

To this end, it is however—as already mentioned briefly—necessary that each of the light strip groups 5 has a plurality of pairs of light strips.

Finally, the column-by-column control of the OLED background illumination 2 enables an effective image separation for the two eyes of the viewer.

Our displays are not limited to the previously described preferred examples. Rather, a multiplicity of variants and modifications are possible, which likewise make use of our discovery and, therefore, fall within the scope of the appended claims.

The invention claimed is:

1. An autostereoscopic display comprising:
   a) a background illumination with a plurality of parallel light strip groups with in each case at least two parallel light strips, wherein the individual light strip groups are arranged next to one another with a first grid dimension, and one or two of the light strips of the background illumination being longer than the other light strips and protruding from the background illumination in the longitudinal direction to facilitate adjustment of a lens grid relative to the background illumination,
   b) the lens grid arranged in a beam path before the background illumination and having a plurality of parallel lens strips, wherein the lens strips are arranged next to one another with a second grid dimension, wherein the first grid dimension of the background illumination differs from the second grid dimension of the lens grid, and
   c) a light modulator arranged in the beam path before the lens grid and displaying image information.

2. The autostereoscopic display according to claim 1, wherein
   a) the individual light strip groups of the background illumination each have a central axis,
   b) the individual lens strips of the lens grid each have one optical axis, and
   c) a selected offset exists between the optical axis of the lens strips and the central axis of the light strip groups.

3. The autostereoscopic display according to claim 2, including at least one of:
   a) the offset between the optical axis of the lens strips and the central axis of the light strip groups increases outwardly from the display center to the display edges, and
   b) the offset between the optical axis of the lens strips and the central axis of the light strip groups in the display center is minimal.

4. The autostereoscopic display according to claim 2, wherein the offset between the optical axis of the lens strips and the central axis of the light strip groups is dimensioned such that the different light strip groups illuminate the same region in the viewing plane, independently of their position within the display.

5. The autostereoscopic display according to claim 1, including at least one of:
   a) the longer light strip used for adjustment facilitation is arranged in the display center, and
   b) a longer light strip is arranged externally on each of the edges of the background illumination for adjustment facilitation.

6. The autostereoscopic display according to claim 1, wherein
   a) a plurality of conductor rails are provided to supply electricity to the light strips, and
   b) the light strips used for adjustment facilitation and the remaining light strips are supplied with electricity by separate conductor rails, and c) the conductor rails for electricity supply of the light strips used for adjustment facilitation have a smaller cross section than the conductor rails for electricity supply of the remaining light strips.

7. The autostereoscopic display according to claim 1, including at least one of:
   a) the background illumination is divided into a plurality of regions which can be controlled separately from one another, and
   b) various regions of the background illumination are four quadrants.

8. The autostereoscopic display according to claim 1, wherein each of the light strip groups contains a plurality of pairs of light strips each to give a plurality of viewers an autostereoscopic visual impression at the same time.

9. The autostereoscopic display according to claim 1, wherein
   a) a controller is provided to control the background illumination and the light modulator,
   b) the controller controls the background illumination and the light modulator in a time-synchronized manner,
   c) the controller controls the light modulator such that the light modulator displays different images for the two eyes of the viewer in a time-sequential manner, and
   d) the controller activates different light strips of the individual light strip groups in the background illumination in a time-sequential manner, which light strips illuminate the two eyes of the viewer in a time-sequential manner.

10. The autostereoscopic display according to claim 1, including at least one of:
    a) the light modulator is an LCD display, and
    b) the background illumination is an OLED illumination.

* * * * *